United States Patent [19]

Waller

[11] Patent Number: 4,717,015
[45] Date of Patent: Jan. 5, 1988

[54] CARPENTER'S ELEVATOR AND CONVEYOR

[76] Inventor: Kenneth C. Waller, P.O. Box 26472, Oklahoma City, Okla. 73126

[21] Appl. No.: 318,395

[22] Filed: Nov. 5, 1981

[51] Int. Cl.$^4$ ............................................. B65G 19/18
[52] U.S. Cl. ..................................... 198/733; 198/735
[58] Field of Search ................. 198/733, 735, 731, 732

[56] References Cited

U.S. PATENT DOCUMENTS

| 2,155,306 | 4/1939 | Ferguson | 198/733 |
| 2,508,847 | 5/1950 | Welling | 198/731 |
| 2,780,343 | 2/1957 | Bunnell | 198/732 |
| 3,180,479 | 4/1965 | Meeks et al. | 198/733 |

OTHER PUBLICATIONS

"Morgen Economy Chain and Flight Conveyor", Morgen Manufacturing Company.

Primary Examiner—Leslie J. Paperner
Assistant Examiner—Jonathan D. Holmes
Attorney, Agent, or Firm—Laney, Dougherty, Hessin and Beavers

[57] ABSTRACT

A carpenter's elevator and conveyor which includes a pair of spaced framework elements transversely interconnected by braces. An elongated material supporting plate extends between the framework elements over the braces and is joined at one longitudinal edge to a guidance plate which extends at an acute angle to the plane of the material supporting plate. An elongated chain channel is positioned centrally in the material supporting plate, and extends parallel to the guidance plate. An endless flexible conveyor has an upper reach lying in the chain channel and carries a plurality of spaced material pusher flights. A motor is drivingly connected to the conveyor and is mounted between the spaced framework elements, and horizontally spaced from one end of the material supporting plate. A motor switch plate is mounted between the motor and material supporting plate, and a motor guard bar extends between the framework elements on the opposite side of the motor from the switch plate.

2 Claims, 7 Drawing Figures

CARPENTER'S ELEVATOR AND CONVEYOR

BACKGROUND OF THE INVENTION

1. Field of the Invention

This invention relates to conveyor devices, and more particularly, to portable conveyor devices which can be used for horizontal or near vertical conveyance of various materials and equipment used in building construction.

2. Brief Description of the Prior Art

In Meeks et al. U.S. Pat. No. 3,180,479, a carpenter's elevator and conveyor is described which functions to convey various types of materials or tools, either from one horizontal location to another, or from ground level to the roof of a building under construction. The carpenter's elevator and conveyor disclosed in the Meeks patent employs an endless chain conveyor which is driven by a motor for the purpose of causing the conveyor to push materials along a material supporting plate from one end of the conveyor to the other. The Meeks et al. conveyor is relatively lightweight and compact in construction to facilitate portability.

In the Meeks carpenter elevator and conveyor, the motor which is used to drive the conveyor, and indeed a portion of the conveyor itself, are disposed at an exposed location adjacent one end of the conveyor, and the flights secured to the conveyor chain are of relatively light construction which limits the carrying capacity of the conveyor.

BRIEF DESCRIPTION OF THE PRESENT INVENTION

The present invention comprises an improved carpenter's elevator and conveyor useful in many ways where the conveyance of heavy materials from one location to another is required, and accessibility of structure facilitating the incorporation and use of a permanent conveyor is precluded. The carpenter's elevator and conveyor structure of this invention is relatively compact to facilitate portability, but is sturdily constructed and constitutes an improvement over conveyors of similar types known to the prior art in its load carrying capacity, and in the extended service life which is characteristic of the structure of the invention.

Broadly described, the carpenter's elevator and conveyor of the invention includes a pair of elongated, horizontally spaced framework elements disposed at opposite sides of the conveyor and transversely interconnected by means of a plurality of transverse brace elements which extend between the spaced framework elements. Disposed over these transverse brace elements, and projecting from side to side of the conveyor between the spaced framework elements is an elongated flat material supporting plate. When the framework elements are extended horizontally for horizontal material conveyance, the attitude of the material supporting plate relative to the framework elements is such that the material supporting plate is inclined to the horizontal, and provides a sloping surface from one side of the conveyor to the other. An elongated guidance plate has one longitudinal edge thereof secured to a longitudinal edge of the material supporting plate so as to define an angle with the material supporting plate.

An elongated conveyor channel is positioned centrally in the material supporting plate for the purpose of receiving an upper run or flight of an elongated endless flexible conveyor. The endless flexible conveyor carries a plurality of spaced material pusher flights or paddle subassemblies. A motor is drivingly connected to the endless conveyor, is mounted between the spaced framework elements, and is horizontally spaced from one end of the material supporting plate. A motor switch plate is mounted between the motor and material supporting plate, and a motor guard bar extends between the framework elements on opposite sides of the motor from the switch plate. The switch plate functions to protect the motor, the electrical circuitry associated therewith and the switch provided for starting and stopping the motor. The motor is also protected by the motor guard bar located on the opposite side thereof from the switch plate.

An important object of the present invention is to provide an improved carpenter's elevator and conveyor structure which is characterized in having an extended trouble free operating life due to the particular location of the various structural elements thereof in relation to each other, and its sturdy mechanical construction.

A further object of the invention is to provide an improved carpenter's elevator and conveyor structure which can accommodate and transport a greater load from one location to another than has been characteristic of similar prior art devices.

Additional objects and advantages of the invention will become apparent as the following detailed description of a preferred embodiment of the invention is read in conjunction with the accompanying drawings which illustrate such preferred embodiment.

GENERAL DESCRIPTION OF THE DRAWINGS

FIG. 6 is a view similar to FIG. 4, but showing, partially in section and partially in elevation, the opposite end of a carpenter's elevator and conveyor structure from that which is depicted and illustrated in FIG. 4.

DETAILED DESCRIPTION OF A PREFERRED EMBODIMENT OF THE INVENTION

Figure 1:
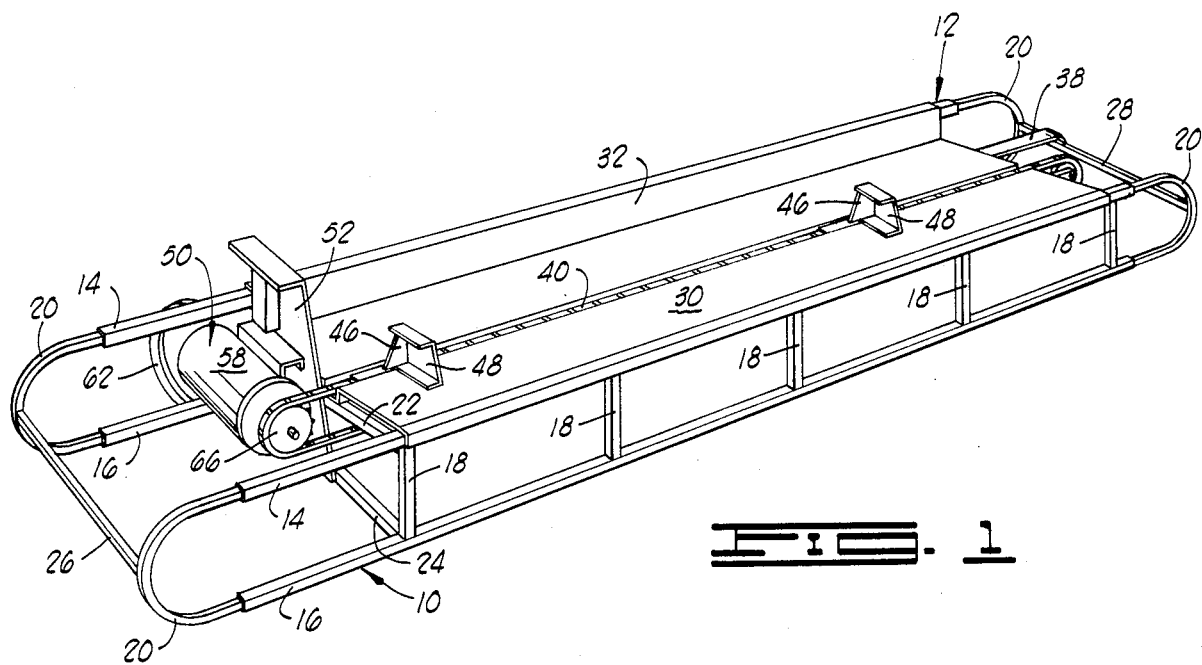
FIG. 1 is a perspective view illustrating a carpenter's elevator and conveyor constructed in accordance with the present invention.
Figure 2:
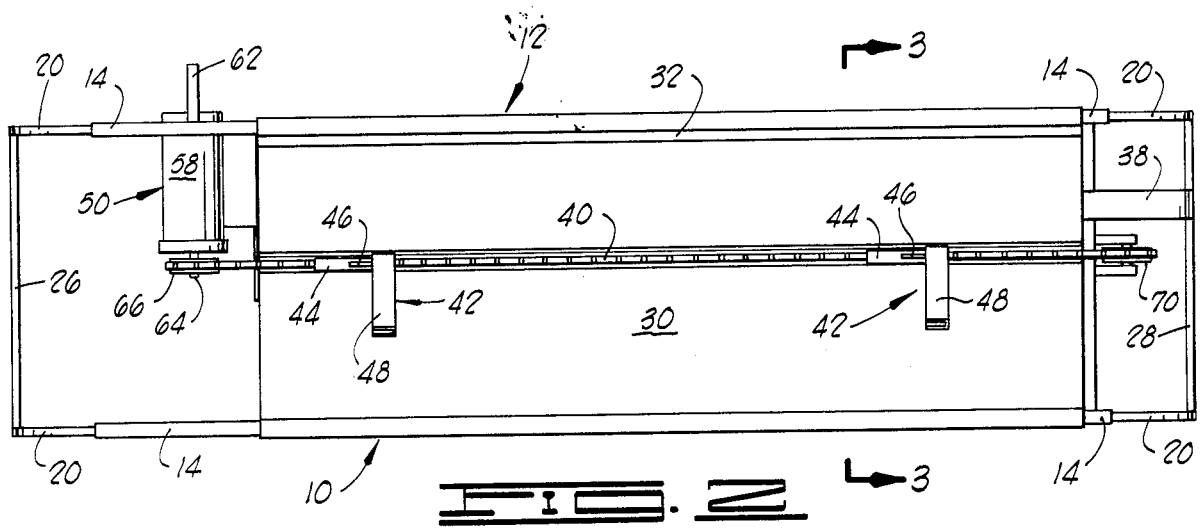
FIG. 2 is a plan view of the structure illustrated in FIG. 1.

Referring initially to FIG. 1 of the drawings, the carpenter's elevator and conveyor structure of the invention is there illustrated and includes a pair of elongated, horizontally spaced framework elements designated generally by reference numerals 10 and 12. Each of the elongated, horizontally spaced framework elements 10 and 12 is substantially identical to the other, and each includes a pair of substantially parallel, elongated tubular frame elements 14 and 16 which are of substantially square transverse cross-sectional configuration. The tubular longitudinal frame elements 14 and 16 are interconnected by a plurality of transverse frame elements 18, also of substantially square cross-sectional configuration. At the opposite end of each of the elongated horizontally spaced framework elements 10 and 12, each of the framework elements is terminated by a generally U-shaped rod 20. Each U-shaped rod 20 has the end portion of each of its legs secured in one of the longitudinally extending tubular frame elements 14 or 16 to impart to each of the spaced framework elements 10 and 12, an elongated oval configuration.

Figure 7:
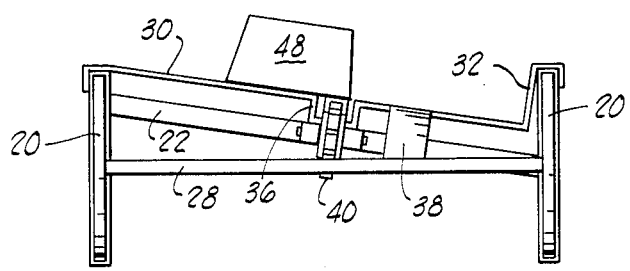
FIG. 7 is an end view similar to FIG. 5, but illustrating the opposite end of the carpenter's elevator and conveyor of the invention.

For the purpose of interconnecting the horizontally spaced framework elements 10 and 12 in an integrated rigid framework, a plurality of transverse brace elements 22 are provided, and each of these brace elements extends between, and has its opposite end connected to, opposed pairs of the transverse frame elements 18 located in the two framework elements 10 and 12. It will be noted in referring to FIGS. 3, 5 and 7 that the brace elements 22 are inclined with respect to the horizontal, or stated differently, project at an angle other than a right angle to the spaced planes defined by the two horizontally spaced framework elements 10 and 12. Thus, one end of each brace element 22 is joined to one of the transverse frame elements 18 at a location near the upper end thereof, and the other end of the respective brace element is joined to a transverse frame element on the opposite framework element in a location near the center of this frame element.

The framework elements 10 and 12 are further interconnected by at least one bottom brace element 24 which extends between the two lower elongated tubular longitudinal brace elements 16 in the two framework elements 10 and 12. The bottom brace element 24 illustrated in FIG. 1 functions with an overlying brace element 22 to support and facilitate the mounting of an electrical switch plate as hereinafter described. At opposite ends of the horizontally spaced framework elements 10 and 12, the U-shaped bars 20 at each end of the frame are interconnected at the bight or web portions thereof by means of interconnecting bars. Thus, at that end of the conveyor upon which a conveyor drive motor is mounted in a manner hereinafter described, a motor guard bar 26 extends transversely between the U-shaped frame elements 20, and at the opposite end of the framework a bar 28 extends between the U-shaped frame elements 20 located at that end of the framework.

Figure 3:
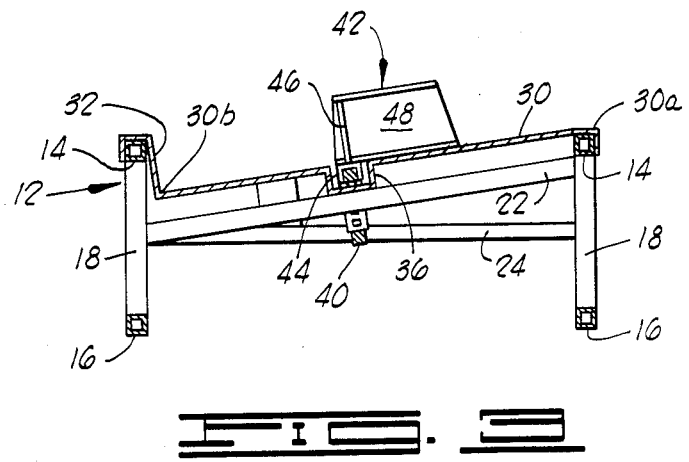
FIG. 3 is a sectional view taken along line 3—3 of FIG. 2.
Figure 4:
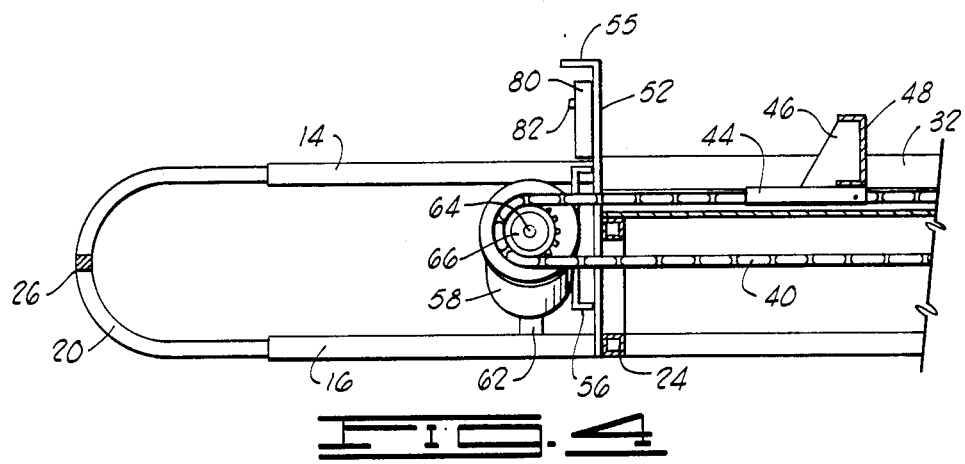
FIG. 4 is a detail view of one end of the elevator and conveyor structure taken partially in section and partially in elevation to show the manner in which the motor forming a part of the invention, and certain associated structural elements, are positioned and structured.
Figure 3:
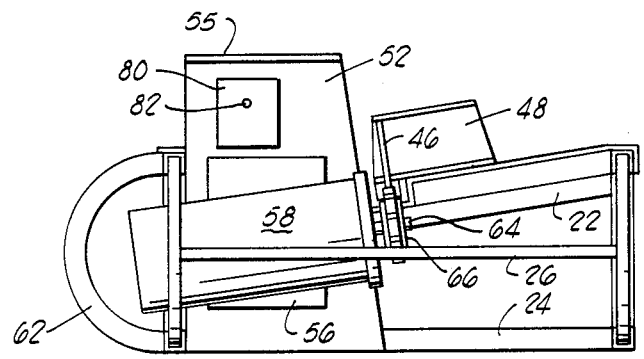

For the purpose of supporting a load to be transported and conveyed by the elevator and conveyor structure from one location to another, an elongated, flat material supporting plate 30 is provided and is positioned so as to extend across the conveyor between the central portions of the spaced framework elements 10 and 12. The material supporting plate 30 is positioned above the brace members 22 and its plane extends substantially parallel to these brace members as shown in FIG. 3. One of the longitudinal edges of the material supporting plate 30 is bent through an angulation conforming to the square cross-sectional configuration of the longitudinal frame element 14 in the framework element 10, and is secured over and against an outer side of this framework element by welding or other suitable means as shown in FIG. 3. The opposite longitudinal edge of the material supporting plate 30 terminates slightly inwardly from the framework element 12, as shown in FIG. 3, and is here secured to the lower edge of an upwardly projecting material guidance plate 32.

The material guidance plate 32 projects at substantially a right angle to the plane of the material supporting plate 30 and has an upper edge portion which is angulated so as to conform to the outer surface of the square cross-sectioned longitudinally extending frame element 14 of the framework element 12. It will be noted in referring to FIG. 1 that the material supporting plate 30 and material guidance plate 32 are substantially shorter than the overall length of the framework elements 10 and 12, and that these plates terminate at end edges which are spaced inwardly a substantial horizontal distance from the opposite ends of the conveyor as defined by the location of the U-shaped frame members 20.

At substantially the center of the material supporting plate 30 (in a transverse sense), a conveyor channel 36 is secured within, and extends substantially the length of, the material supporting plate. The conveyor channel 36 is of a substantially rectangular cross-sectional configuration and is open at the upper side thereof. It should be pointed out that the conveyor channel 36, which extends from one end of the material supporting plate 30 to the other, can be formed integrally with the material supporting plate 30 and in fact, in a preferred method of construction of the elevator and conveyor of the present invention, the material supporting plate 30, conveyor channel 36 and material guidance plate 32 are all formed from a single sheet of metal through an appropriate bending procedure.

Adjacent one end of the conveyor, a relatively narrow material discharge band 38 is positioned, and has one of its ends secured to the transverse end edge of the material supporting plate 30 at a location immediately to one side of the conveyor channel 36, and its other end bent downwardly and secured to the bar 28.

For the purpose of moving a material to be conveyed along the conveyor from one location to another, an endless flexible conveyor is provided, and in the illustrated embodiment, includes an elongated endless chain 40. The chain 40 is a substantially conventional structure adapted to be engaged by sprockets for the purpose of driving and guiding the chain. The chain 40 includes an upper run or course which lies in and is guided by the conveyor channel 36. The chain 40 also includes a lower run which passes directly beneath the conveyor channel 36 and under the brace members 22 as shown in FIG. 3.

The chain 40 carries a plurality of spaced flight subassemblies designated generally by reference numeral 42. Each of the flight subassemblies 42 is constructed in the manner best illustrated in FIGS. 1, 3 and 6 and includes an elongated U-shaped channel member 44. The channel member 44 is secured to one side of the chain 40 opposite that side of the chain which is entered by the teeth of sprockets used to drive the chain and guide it during its conveying function. The U-shaped channel 44 thus does not obscure or block the open opposite side of the chain which receives these sprocket teeth.

The channel 44 has secured to the central portion or web thereof, a trapezoidally shaped reinforcing gusset plate 46. Each of the gusset plates 46 projects into, and is secured to, a channel-shaped paddle 48 so as to provide points of securement in the paddle where the gusset plate intersects and contacts the legs of the respective paddle, and also where one edge of the gusset plate contacts a surface of the web of each channel-shaped paddle. The channel-shaped paddle then extends laterally from its point of attachment to the gusset plate 46 so that one of the legs of the channel-shaped paddle bears flatly against the upper surface of the material supporting plate 30 in the manner best illustrated in FIGS. 1 and 5.

Figure 5:
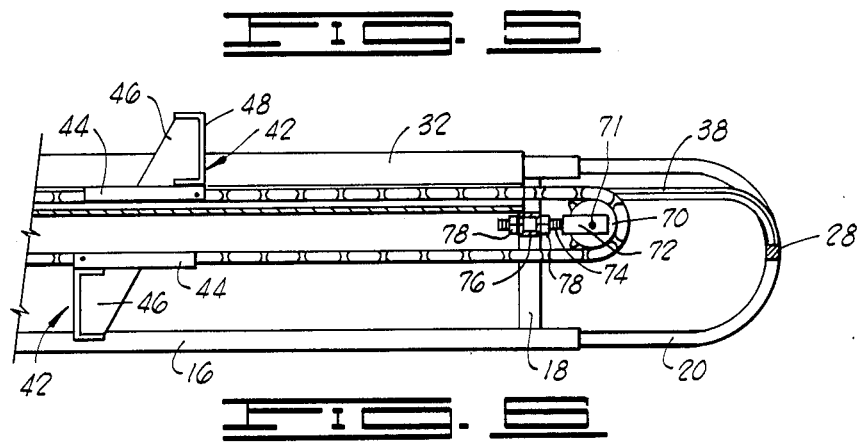
FIG. 5 is an end elevation view of the carpenter's elevator and conveyor of the invention as it appears when viewed from the motor end thereof.

For the purpose of driving the chain of the conveyor to enable the channel shaped paddles 48 constituting a part of the flights 42 to push a material from one end of the conveyor to the other, a motor drive subassembly 50 is provided adjacent one end of the material supporting plate 30 and includes a vertically extending switch and motor mounting plate 52. The switch and motor mounting plate 52 is generally trapezoidal in configuration and has a lower edge portion secured to one of the bottom brace elements 24 as shown in FIG. 5. Intermediate its vertical extent, the switch and motor mounting plate 52 is secured to one side of the transverse brace element 22 positioned directly below one end edge of the material supporting plate 30. The top end portion of the switch and motor mounting plate 52 is turned over at a right angle to the major plane thereof, to form a flange 55 which projects in a direction away from the material supporting plate 30.

It will be noted in referring to FIGS. 1 and 5 that the switch and motor mounting plate 52 projects upwardly to an extent such that it is substantially higher above the upper surface of the material supporting plate 30 than the paddle 48 of each of the flight subassemblies 42 extends. In this way, the switch and motor, hereinafter described, are protected from impact by any type of load which might be inclined to slide rearwardly upon the material supporting plate either as a result of failure of the conveyor, or of the motor driving unit, or simply the carelessness of the workman who may place shingles, paneling or other material on the material supporting plate at a location between an upwardly moving flight and one which has not yet passed by the switch and motor mounting plate 52. This function will become more apparent as the following description proceeds.

On the side of the switch and motor mounting plate 52 which faces away from the material supporting plate 30, a motor mounting bracket 56 of generally U-shaped configuration is secured to the flat vertically extending surface of the plate 52 at about the center thereof and supports a drive motor 58. It will be noted in referring to FIG. 5 that the location of the drive motor 58 on the plate 52 is such that the drive motor is protected to a large degree by the interposition of the motor guard bar 26 and the two U-shaped rods 20. It will also be noted in referring to FIGS. 1 and 5 that, for the purpose of providing further protection for the motor, a generally semi-circular guard ring 62 is secured to the outer side of the framework element 20 by securement of the opposed ends of the guard ring to the elongated tubular frame elements 14 and 16.

A drive shaft 64 projects from one end of the motor 58 and has keyed thereto, a drive sprocket 66. The drive sprocket 66 carries teeth which engage the links of the chain 40 for the purpose of driving the chain through its course during operation of the conveyor. It will be noted in FIG. 5 that the orientation of the channel-shaped paddles 48 forming a part of each of the flights 42 is such that these paddles clear the motor 58 as the paddles pass upwardly around the sprocket 66 as the chain 40 is being driven. Finally, it will be noted in referring to FIG. 5 that the motor 58 is mounted so that the axis of the motor and of the shaft 64 which projects therefrom extend substantially parallel to the plane of the material supporting plate 50 so that the chain can be driven with its upper and lower runs moving in a plane which extends substantially normal to the plane of the material supporting plate.

At the opposite end of the conveyor, an idler roller 70 is rotatably mounted upon a shaft 71 which is received in the opposite legs of a suitable clevis bracket 72. The clevis bracket 72 is carried on one end of a shaft 74 which passes through a bar 76 carrying locking and adjusting nuts 78 at opposite sides thereof. The locking and adjusting nuts 78 engage threads on the shaft 74 and thus facilitate adjustment of the distance toward the end of the conveyor which the tensioning sprocket 70 may be positioned. In this way, by adjustment of the position of the shaft 74 and clevis brackets 72 in relation to the bar 76, the tension in the chain 40 can be adjusted as desired.

For the purpose of selectively providing electric power to the motor 58, a switch box 80, which has a manually operable switch lever 82 projecting therefrom, is mounted on that side of the switch and motor mounting plate 52 which is opposite the side facing the material supporting plate 30 at a location above the motor 58, and displaced away from the plane in which the upper and lower runs of the chain 40 move. The switch box 80 and switch element 82 are thus also protected by the plate 52, and particularly by the flange 52a, from destructive impact with material placed on the material supporting plate, and the operator of the conveyor who has occasion to operate the switch is also protected during such operation.

Operation

In the operation of the carpenter's elevator and conveyor of the invention, the elevator and conveyor may be used either for effecting the horizontal conveyance of various types of construction materials from one location to another, or for elevating such materials from one horizontal level to another. Typical of the latter usage is the use of the device for moving bundles of shingles or quantities of roofing from the ground level to the roof of a building under construction.

Considering the use of the device in a roofing situation of the type described, that end of the elevator and conveyor at which the motor subassembly 50 is located is rested upon the ground, and the opposite end of the conveyor is lifted upwardly until the elevator and conveyor inclines at an angle of say of 45° to the vertical. Where the terrain warrants, a stake may then be placed in the ground against the motor guard bar 26 to prevent sliding or creeping of the elevator and conveyor outwardly away from the building.

It will be noted that in this status of the elevator and conveyor of the invention, the motor is protected from contact with objects on the ground by the guard bar 26, the U-shaped bars 20 and the guard ring 62. Further, the motor is sufficiently spaced inwardly from the lower end of the carpenter's elevator and conveyor that when the device is oriented in the attitude described, it is easily accessible to an operator and the switch element 82 can be easily reached.

With the carpenters' elevator and conveyor thus oriented, a bundle of shingles or other material to be conveyed to the roof is placed upon the material supporting plate 30 at a location spaced upwardly slightly from the switch and motor supporting plate 52 and, in all events, in a position where the material can be easily engaged by one of the flights 42 and moved upwardly along the conveyor during operation thereof. At this time, the switch element 82 is manually turned to the ON position to energize the motor 58. The chain 40 is thus placed in operation and is driven from the drive sprocket 66. This causes the flights 42 secured to the chain 40 to move upwardly along the upper surface of the material supporting plate 30 and to come into position behind, or on the lower side of, the material to be conveyed to the roof. Good support is provided for the material to assure that it is not sloughed or moved off the pushing U-shaped paddles 48 by the transverse width of these paddles and the confining effect of the guidance plate 32. When the material being moved upwardly by the flights 42 reaches the upper end of the conveyor, it can move easily off the conveyor and onto the roof by reason of the location at the upper end of the conveyor of the material discharge band 38.

It should be noted that the construction of the flights 42 is such that they are of very high mechanical strength and can be used for pushing very heavy loads upwardly at a steep angle. Moreover, little risk or danger to the operator is presented in elevating such loads since, should they slip off of one of the paddles 48, they will not damage the motor 58 or injure the operator due to the interposition of the plate 52.

From the foregoing description of the invention, it will be apparent that the present invention provides a compact, mechanically rugged carpenter's elevator and conveyor which can be easily moved from one location to another, yet possesses sufficient strength and power to elevate heavy loads to an elevated location, or, alternatively, move them horizontally. Although a preferred embodiment of the invention has been herein described in order to illustrate the principles of the invention, it will be understood that various changes and innovations can be effected in the illustrated and described structure without departing from the basic principles. Changes and innovations of this type are therefore deemed to be circumscribed by the spirit and scope of the invention except as the same may be necessarily limited by the appended claims, or reasonable equivalents thereof.

What is claimed is:

1. A carpenter's elevator and conveyor comprising:
a pair of elongated, horizontally spaced framework elements, each of substantially monoplanar configuration and each having arcuate, parallel rounded end portions of substantially semi-circular configuration at opposite ends thereof;
transverse braces interconnecting said framework elements intermediate the rounded end portions of said framework;
a flat, elongated material supporting plate extending between the framework elements over, and supported by, said braches;
an elongated guidance plate having a first longitudinal edge secured to a longitudinal edge of said material supporting plate and a second longitudinal edge secured to one of said framework elements;
an elongated conveyor channel positioned centrally in the material supporting plate and extending substantially parallel to said guidance plate and disposed at a location below the upper surface of said material supporting plate;
an endless flexible conveyor including an endless chain having an upper reach lying in the conveyor channel and carrying a plurality of spaced flights;
a motor drivingly connected to the conveyor chain and mounted between the spaced framework elements at a location horizontally spaced from one end of the material supporting plate, and offset to one of said elongated conveyor channel;
a motor switch plate mounted between the motor and the material supporting plate, and projecting to a location spaced further vertically from the material supporting plate than the upper side of the motor for protecting the motor from contact with material supported on the material supporting plate;
a motor guard extending between, and transverse to, the arcuate parallel rounded portions of one end of the framework elements and located on the opposite side of the motor from the switch plate and the material supporting plate; and
a guard ring of semi-circular configuration secured to one of said framework elements at the opposite side thereof from said motor and in substantially transverse alignment with the motor to prevent inadvertent contact with the motor;
each of said flights of said endless flexible conveyor comprising:
an elongated U-shaped channel member secured to one side of said chain so that the web portion of said U-shaped channel member extends across and lies over the upper side of said upper reach of said chain, and the side flanges of said U-shaped channel member extend downwardly along the sides of said chain to leave the bottom of said chain open for driving sprocket engagement;
a channel-shaped material pushing paddle secured across said U-shaped channel by securement of a flange of said channels-shaped paddle to the web portion of said U-shaped chanel, said channel-shaped paddle opening toward said motor switch plate, and disposed on the opposite side of said conveyor channel from said motor switch plate so that said channel-shaped paddle can pass by and clear said motor switch plate during operation of the flexible conveyor; and
a gusset plate secured to the upper surface of the web portion of said U-shaped channel and to said channel-shaped material pusher paddle between the opposed flanges thereof for strengthening said paddle.

2. A carpenter's elevator and conveyor comprising:
a pair of elongated, hroizontally spaced framework elements, each of said framework elements having arcuate, parallel rounded portions at opposite ends thereof with the rounded portions of said framework elements being located in alignment with each other and facilitating rocking of the conveyor from one vertical angulation to another when rested upon the ground with aligned arcuate round portions at one end of the conveyor in contact with the ground;
transverse braces interconnecting said framework elements;
a flat, elongated mateial supporting plate extending between the framework elements over said braces;
an elongated guidance plate having a first longitudinal edge secured to a longitudinal edge of said material supporting plate, and a second longitudinal edge secured to one of said framwork elements;
an elongated conveyor channel positioned centrally in the material supporting plate and extending substantially parallel to said guidance plate;

an endless flexible conveyor having an upper reach lying in the conveyor channel and carrying a plurality of spaced, material pusher filights, said endless conveyor comprising an endless chain having links adapted for engagement by sprockets, and wherein each of said flights comprises:

a U-shaped channel member secured to one side of said chain;

a channel-shaped paddle secured across said U-shaped channel and projecting over said material supporting plate to one side of said endless chain; and a gusset plate secured to said U-shaped channel and said channel-shaped paddle for strengthening said paddle;

a motor drivingly connected to the conveyor and mounted between the spaced framework elements at a location horizontally spaced from one end of the material supporting plate;

a motor switch plate mounted between the motor and the material supporting plate for protecting the motor from contact with material supported on the material supporting plate; and a motor guard extending between, and transverse to, the arcuate parallel rounded portions at one end of said framework elements on the opposite side of the motor from the switch plate and the material supporting plate in a position to avoid interference with the rocking of the elevator when rested upon said arcuate rounded portions at one end of the elevator while protecting the motor from inadvertent contact by one approaching the elevator and conveyor.

* * * * *